United States Patent Office 3,378,487
Patented Apr. 16, 1968

3,378,487
METHOD OF TREATING WASTE WATER CONTAINING NICKEL
Earl Jacob Chaney, R.R. 3, Tiffin, Ohio 44883
No Drawing. Filed Oct. 13, 1965, Ser. No. 495,693
5 Claims. (Cl. 210—11)

ABSTRACT OF THE DISCLOSURE

Nickel in sewage is rendered harmless to bacteria by chelating the nickel and adjusting the pH value to between about 6 and about 8.

---

This invention relates to the art of treating waste waters containing nickel, and is primarily concerned with a new method of protecting bacteria in sewage disposal systems against the toxic effects of nickel.

It has long been known that the activity and growth of bacteria in waste water systems, particularly sewage systems, vary widely depending on the nature of the waste waters, and in some instances the bacteria in the system may even be killed.

Prior workers in the art, for example, Keefer et al., in their paper entitled, "Effect of pH of Sewage on the Activated Sludge Process," which appeared in Sewage Works Journal, 23, 982–991 (1951), have attributed these harmful effects to the pH of the water. Other workers, for example Morgan et al. in their paper entitled, "BOD Determinations in Wastes Containing Chelated Copper or Chromium," which appeared in Sewage and Ind. Wastes, 30, 283, 286 (1958), advocated the chelation of copper or chromium in such wastes as a means of preventing the inhibition or activity of growth of bacteria.

Numerous other proposals have been made of ways and means to protect the bacteria in such waste waters but so far as I know, no one prior to my invention has discovered that the presence of nickel in the water was the primary chief cause of harm to bacteria therein. I have discovered that such is the case and in the present specification disclose a method for preventing decreased activity or growth and destruction of the bacteria in waste waters containing nickel.

Briefly described, the present invention renders nickel in the waste waters harmless to bacteria and, succinctly stated, may be carried out by chelating the nickel with the proper amount of a suitable chelating agent and adjusting the pH of the bacteria containing material to between a range within which the bacteria present will not be seriously affected. This pH range may range from 6 to about 8 but preferably between about 6.6 and about 7.5.

The present invention will be better understood by those skilled in the art from a description of it as applied to raw sewage.

In a sewage treating plant raw sewage is first passed through grinders to reduce the solids to pieces of small sizes and then the rather thick solution is passed into an aerating tank where it is agitated by passing air under pressure thereinto. During aeration the bulk of the liquid is withdrawn and the remaining rather thick sludge is passed into a settling tank. The solids are allowed to settle for about 24 hours and are then drawn off and placed in a digester. There they remain for a prolonged time while the bacteria act on the solids to such an extent that the remaining solids and liquid may be safely discharged into a stream.

The present invention is concerned primarily with the aerating step and consists of adding to the raw sewage entering the aerating tank a chelating agent in such amounts and in such proportions and at such a rate as will result in chelating substantially all the nickel in the sewage. In other words, the chelating agent is added continuously as the raw sewage continuously enters the tank and in such amounts and proportions that each increment of sewage will receive substantially the same amount of the chelating agent, which is predetermined to be only about sufficient to chelate the nickel in that increment.

The prompt chelating of the nickel prevents any substantially harmful effect of the nickel content on the bacteria and, when the thick solids are brought into the settling tank, the activity of the bacteria will proceed uninterruptedly during the settling operation. That activity continues during the prolonged time during which the solids remain in the digester. During all this time there is substantially no nickel in the presence of the bacteria and in a condition to affect the bacteria in a harmful way.

There are many chelating agents which may be used in carrying out the present invention, it being understood that a suitable chelating compound is one which will form a complex with nickel which is soluble in the water of the system and which is sufficiently stable to resist decomposition in that system. The chelating compounds which are suitable for this purpose consist of ethylenediaminetetraacetic acid, commonly known as Versene acid or EDTA, alkaline salts of EDTA, for example, calcium EDTA, acidic salts of EDTA, for example, ferrous EDTA, and other alkaline and acid salts of EDTA.

When the waste water or raw sewage to be treated is acidic, a basic salt of EDTA is employed, and when that liquid is alkaline, EDTA or an acid salt of EDTA is added. In this manner the pH of the waste water or raw sewage may be at least partially adjusted by the addition of the chelating agent. Preferably, the addition of the chelating compound should tend to adjust the pH of the solution toward the permissible range and, preferably, toward the range of about 6.6 to about 7.5. When suitably selected, the chelating agent will serve not only to chelate the nickel and form soluble, fairly stable complexes but also to adjust the pH value toward the permissible range.

It has been found that when raw sewage is treated according to the above described process, the bacteria therein will continue to possess their normal activity and will grow normally and will utilize to the fullest extent the oxygen in the systems. Furthermore, the chelating complexes contained in the water discharged from the sewage treating plant have been found not to interfere with the normal bacterial and algael growth along streams into which such effluent is discharged, even though the nickel ion content would be injurious to such growths if present in the unchelated condition.

In order that only enough chelating agent should be used to chelate the nickel present from time to time in the waste waters, it is advisable to determine the nickel content not only initially, that is before the chelating agent is brought into the aerator but from time to time while the waste waters are flowing thereinto. To that end, the waste water is analyzed to determine the parts per million of nickel present. Then, a calculation is made as to the amount of the selected chelating agent to be added for chelating that amount of nickel. The pH value of the waste waters should also be determined and the value therein will continue to possess their normal activity and found should be used in selecting the chelating agent as above described. Then, the selected chelating agent is fed into the waste waters flowing into the aerator at a rate proportional to the rate of flow of those waters so that the predetermined amount of chelating agent will be added to each predetermined increment of waste waters.

The present invention will be better understood from the following example which is given for purposes of illustration and is not to be considered in a restricting or limiting sense.

Raw sewage was analyzed and found to contain about 2.0 p.p.m. of nickel and to have a pH of about 7.2. It was decided that 85 pounds of Versene acid, EDTA, would be required for each 1,000,000 gallons of that sewage and that amount of the acid was added more or less continuously to the sewage as it was flowing into the aerating tank. The determination of the pH of the solution after such addition was found to be about 6.4. Thereupon, enough lime was added to bring the pH to between about 6.6 and about 7.5 while the other contents were maintained substantially constant. It was found that the bacteria suffered no ill effects but, on the contrary, exhibited the customary activity and growth which is characteristic when the bacteria are operating in a solution free from nickel. When the Versene acid is not added to the same type of raw sewage, practically all the bacteria in the system were killed in a short time.

In the foregoing example the nickel content stated is about twice as much as has been found to be toxic to bacteria in a sewage system. As the amount of the nickel varies downwardly from 2.0 p.p.m. the toxicity is less and, hence, smaller amounts of the chelating agent may be used. When the nickel varies upwardly from 2.0 p.p.m. the toxicity is greater and, hence, larger amounts of the chelating agent may be used.

While it is preferable to add the chelating agent continuously and in proportion to the incoming raw sewage, as just described, it is to be understood that the entire amount of the chelating agent may be added to the sewage at one time, particularly where the length of flow time of the sewage is short. When the Versene acid is calculated on the basis of a flow of one million gallons of raw sewage in an eight hour day, it is preferable that the acid be added more or less continuously so that its flow will be substantially uniform and always proportional to the flow of the sewage.

Although the foregoing example dealt with slightly alkaline sewage, it is to be understood that acidic salts of EDTA might be used instead of EDTA desired. If the sewage is acid, an alkaline salt of EDTA should be used. Lime is mentioned as being suitable to reduce the acidity of the sewage because it is quite inexpensive but other well known neutralizing agents may be used in lieu thereof, if desired.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. The method of treating waste water containing nickel and bacteria which comprises the steps of bringing such water into a tank and agitating the water by means of air discharged thereinto, bringing into said water a chelating agent sufficient in amount to chelate substantially all the nickel in said water, and at least partially to adjust the pH value of the bacteria containing material to between about 6 and about 8.

2. The method of treating raw sewage containing nickel and bacteria which comprises the steps of bringing such sewage into a tank and agitating the sewage by means of air discharged thereinto, bringing into said sewage a chelating agent sufficient in amount to chelate substantially all the nickel in said sewage, and at least partially to adjust the pH value of the bacteria containing material to between about 6 and about 8.

3. The method of treating raw sewage which comprises the steps of continuously bringing raw sewage containing nickel and bacteria into a tank and agitating the liquid by discharging air thereinto, continuously bringing into said tank a chelating agent sufficient in amount and capable of chelating the nickel and at least partially adjusting the pH value of the bacteria containing material to between about 6 and about 8, proportioning the chelating agent to the incoming raw sewage so that each increment of the sewage will receive substantially the same amount of the chelating agent.

4. The method of treating raw sewage which comprises the step of continuously bringing raw sewage containing nickel into a tank and agitating the sewage by discharging air thereinto, continuously bringing into said tank a chelating agent selected from the group of chelating agents consisting of EDTA, alkaline salts of EDTA, and acidic salts of EDTA, the chelating agent selected having a pH value such as to tend to bring the pH value of the raw sewage into the pH range of from a 6 to about 8, and proportioning the chelating agent to the incoming raw sewage so that each increment of the sewage will receive substantially the same amount of the chelating agent.

5. The method of treating raw sewage which comprises the step of continuously bringing raw sewage containing nickel into a tank and agitating the sewage by discharging air thereinto, continuously bringing into said tank a chelating agent selected from the group of chelating agents consisting of EDTA, alkaline salts of EDTA, and acidic salts of EDTA, the chelating agent selected having a pH value such as to tend to bring the pH value of the waste sewage into the pH range of from about 6 to about 8, proportioning the chelating agent to the incoming raw sewage so that each increment of the sewage will receive substantially the same amount of the chelating agent, and adjusting the pH of the sewage to between about 6.6 and about 7.5.

References Cited

OTHER REFERENCES

Sequestrene, a publication of Geigy, Industrial Chemicals, Ardsley, N.Y., 1952, pp. 1–7 and 9–11 relied on.

Morgan, G. B., et al.: BOD Determinations etc., Sew. and Ind. Wastes, March 1958, vol. 30, pp. 283–286.

Malaney, G. W., et al.: Toxic Effects etc., Sew. and Ind. Wastes, November 1959, vol. 31, pp. 1309–1315.

McDermott, G. N., et al.: Nickel in Relation to Activated Sludge etc., Jour. WPCF, February 1965, pp. 163–177.

MICHAEL E. ROGERS, *Primary Examiner.*

UNITED STATES PATENT OFFICE
CERTIFICATE OF CORRECTION

Patent No. 3,378,487                  April 16, 1968

Earl Jacob Chaney

It is certified that error appears in the above identified patent and that said Letters Patent are hereby corrected as shown below:

Column 2, line 68, strike out "therein will continue to possess their normal activity and"; column 4, line 33, for "a" read -- about --.

Signed and sealed this 22nd day of July 1969.

(SEAL)

Attest:

William M. Fletcher, Jr.                  WILLIAM E. SCHUYLER, JR.

Attesting Officer                          Commissioner of Patents